(12) United States Patent
Belisle et al.

(10) Patent No.: US 11,841,350 B2
(45) Date of Patent: Dec. 12, 2023

(54) DYNAMIC AXIAL COMPRESSION FOR PREPARATIVE COLUMNS USING EXTERNAL COMPRESSION

(71) Applicant: Bio-Rad Laboratories, Inc., Hercules, CA (US)

(72) Inventors: Christopher Belisle, Walnut Creek, CA (US); Mark A. Snyder, Oakland, CA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 0 days.

(21) Appl. No.: 17/695,672

(22) Filed: Mar. 15, 2022

(65) Prior Publication Data

US 2022/0299486 A1    Sep. 22, 2022

Related U.S. Application Data

(60) Provisional application No. 63/181,133, filed on Apr. 28, 2021, provisional application No. 63/161,823, filed on Mar. 16, 2021.

(51) Int. Cl.
| | |
|---|---|
| *B01D 15/22* | (2006.01) |
| *G01N 30/52* | (2006.01) |
| *G01N 30/60* | (2006.01) |

(52) U.S. Cl.
CPC ............ *G01N 30/52* (2013.01); *B01D 15/22* (2013.01); *G01N 30/6021* (2013.01); *G01N 2030/522* (2013.01)

(58) Field of Classification Search
CPC .............. G01N 30/52; G01N 30/6021; G01N 2030/522; B01D 15/22
See application file for complete search history.

(56) References Cited

U.S. PATENT DOCUMENTS

| | | |
|---|---|---|
| 4,350,595 A | 9/1982 | Gunkel |
| 4,537,217 A | 8/1985 | Allen, Jr. |
| (Continued) | | |

FOREIGN PATENT DOCUMENTS

| | | |
|---|---|---|
| CN | 201001975 Y | 1/2008 |
| CN | 202128946 U | 2/2012 |
| (Continued) | | |

OTHER PUBLICATIONS

Siu, S., et al., "Packing of large-scale chromatography columns with irregularly shaped glass based resins using a stop-flow method", Biotechnol. Prog., vol. 30, No. 6, pp. 1319-1325. (Year: 2014).*

(Continued)

*Primary Examiner* — Benjamin L Lebron
(74) *Attorney, Agent, or Firm* — Kilpatrick Townsend and Stockton LLP

(57) ABSTRACT

A dynamic axial compression column is disclosed herein. This dynamic axial column utilized external compression to prevent the creation of end plate space in the column. The dynamic axial column can include a tube defining a first opening, a second opening, and a lumen extending there between. The dynamic axial column can include a first end plate assembly sealing the first opening and movably extending at least partially into the lumen via the first opening, a second end plate assembly sealing the second opening, a plurality of rods extending along the outside of the tube and connecting the first end plate assembly and the second end plate assembly, and a first plurality of compression devices external to the tube and engaging one of the plurality of rods to bias the first end plate assembly towards the second end plate assembly.

21 Claims, 7 Drawing Sheets

(56) References Cited

U.S. PATENT DOCUMENTS

| | | | |
|---|---|---|---|
| 4,797,209 | A | 1/1989 | Jackson |
| 5,951,873 | A | 9/1999 | Shalon et al. |
| 6,036,855 | A | 3/2000 | Shalon et al. |
| 6,090,278 | A | 7/2000 | Lally et al. |
| 6,524,484 | B2 * | 2/2003 | Davis ................ G01N 30/6004 210/659 |
| 6,641,736 | B2 | 11/2003 | Tuvim |
| 7,578,934 | B2 | 8/2009 | Gill et al. |
| 11,280,770 | B2 | 3/2022 | Maisch |
| 2005/0011821 | A1 | 1/2005 | Held et al. |
| 2007/0138098 | A1 * | 6/2007 | Spencer ............ G01N 30/6047 73/61.53 |
| 2010/0163490 | A1 | 7/2010 | Lasalle |
| 2015/0190733 | A1 | 7/2015 | McChesney et al. |
| 2016/0250566 | A1 * | 9/2016 | Bailey .................. G01N 30/60 210/198.2 |
| 2019/0310233 | A1 | 10/2019 | Maisch |

FOREIGN PATENT DOCUMENTS

| | | |
|---|---|---|
| CN | 102062071 B | 8/2013 |
| CN | 102836572 B | 11/2014 |
| CN | 205886291 U | 1/2017 |
| CN | 207822570 U | 9/2018 |
| CN | 209215303 U | 8/2019 |
| CN | 209575843 U | 11/2019 |
| CN | 211348075 U | 8/2020 |
| DE | 102019001392 A1 | 10/2019 |
| EP | 0040663 B1 | 5/1980 |
| EP | 2633304 B1 | 12/2016 |
| WO | 2002086486 A2 | 10/2002 |
| WO | 2007/099237 A2 | 9/2007 |
| WO | 2013048996 A1 | 4/2013 |

OTHER PUBLICATIONS

International Search Report and Written Opinion in PCT/US2022/020426 dated Jun. 14, 2022; 10 pages.

* cited by examiner

DYNAMIC AXIAL COMPRESSION FOR PREPARATIVE COLUMNS USING EXTERNAL COMPRESSION

CROSS-REFERENCE TO RELATED PATENT APPLICATIONS

The present patent application claims benefit of priority to U.S. Provisional Patent Application No. 63/181,133, filed on Apr. 28, 2021, and U.S. Provisional Patent Application No. 63/161,823, filed on Mar. 16, 2021, the entirety of each of which is hereby incorporated by reference for all purposes.

BACKGROUND

Chromatography is a technique for the separation of a mixture. The mixture is dissolved in a fluid (gas or liquid such as water) called the mobile phase. The fluid carries the mixture through a feature that includes a material called the stationary phase. Different molecules within the mixture remain on or in the stationary phase for different amounts of time, causing them to separate.

The stationary phase can be media loaded and/or packed within a column. In a chromatographic separation process, the efficiency of the column used is a key parameter. The stationary phase in a column is generally a solid product in the form of fine particles. The fine particles are tightly packed into the column to form a chromatographic bed. The column itself is generally a hollow tube with end plates fixed at both ends to contain the packed particles. The bottom plate is generally fixed inside the column while the top plate can be moved up or down to allow for packing of beds of different height.

In order to obtain a high efficiency, the arrangement of the particles inside the column must be as homogeneous as possible. In addition, there should be little or no space between the underside of the top plate and the top surface of the packed bed. For incompressible particles such as silica, hydroxyapatite, glass, etc., maintaining homogeneity and top-plate-to-bed-surface contact can be difficult due to post-packing settling of the chromatographic bed. Such settling can arise, for example, during transport or while flowing the mobile phase through the column. Accordingly, improvements to chromatographic columns are highly beneficial.

BRIEF SUMMARY

One aspect of the present disclosure relates to a dynamic axial compression column. The dynamic axial compression column includes a tube defining a first opening, a second opening, and a lumen extending from the first opening through the tube to the second opening. The dynamic axial compression column includes a first end plate assembly sealing the first opening and movably extending at least partially into the lumen via the first opening, a second end plate assembly sealing the second opening, a plurality of rods each extending along the outside of the tube and connecting the first end plate assembly and the second end plate assembly, and a first plurality of compression devices external to the tube. In some embodiments, each of the first plurality of compression devices engages one of the plurality of rods and biases the first end plate assembly towards the second end plate assembly.

In some embodiments, the dynamic axial compression column further includes media filling the lumen. In some embodiments, the media is compressible. In some embodiments, the media is incompressible. In some embodiments, the media can be at least one of silica, alumina, zirconia, glass, hydroxyapatite, and flourapatite.

In some embodiments, the first plurality of compression devices can apply a first pressure to the media filling the lumen. In some embodiments, the first pressure is less than a maximum pressure for applying to the media without damaging the media.

In some embodiments, the plurality of rods are at least two rods. In some embodiments, each of the first plurality of compression devices can be a spring. In some embodiments, the spring can be a disc spring. In some embodiments, the disc spring can be a plurality of stacked discs. In some embodiments, at least two of the plurality of stacked discs have opposite orientations.

In some embodiments, the dynamic axial compression column further includes an equalizing plate positioned between the first plurality of compression devices and the first end plate assembly. In some embodiments, the equalizing plate can equally transfer force from the first plurality of compression devices to the first end plate assembly.

In some embodiments, the second end plate assembly movably extends at least partially into the lumen via the second opening. In some embodiments, the dynamic axial compression column further includes a second plurality of compression devices. In some embodiments, each of the second plurality of compression devices are external to the tube. In some embodiments, each of the second plurality of compression devices engage one of the plurality of rods and bias the second end plate assembly towards the first end plate assembly.

In some embodiments, the first plurality of compression devices can apply a first pressure to bias the first end plate assembly towards the second end plate assembly. In some embodiments, the first pressure is equal to or greater than a backpressure in the chromatography column and thereby eliminates headspace creation.

In some embodiments, the tube is circular. In some embodiments, the tube has a diameter of at least three centimeters. In some embodiments, the first end plate assembly includes a first inward face. In some embodiments, the second end plate assembly includes a second inward face. In some embodiments, each of the first inward face and the second inward face are covered by a frit.

DETAILED DESCRIPTION

Efficiency and/or effectiveness of a chromatography column at least partially depends on the homogeneity of the packing of the chromatographic bed. Specifically, the formation of voids or channels within the chromatographic bed decreases the efficiency and effectiveness of the column.

High efficiency requires that the particles inside the packed bed of the column must be as homogeneous and stable as possible. However, maintaining such homogeneity and stability can be difficult due to settling of the chromatographic bed after packing that can arise due to movement or jostling of the column such as can occur during transport, storage, or installation, or due to the flowing of the mobile phase through the column. Additional settling can result in a void at the top of the column which decreases bed efficiency.

Figure 1:
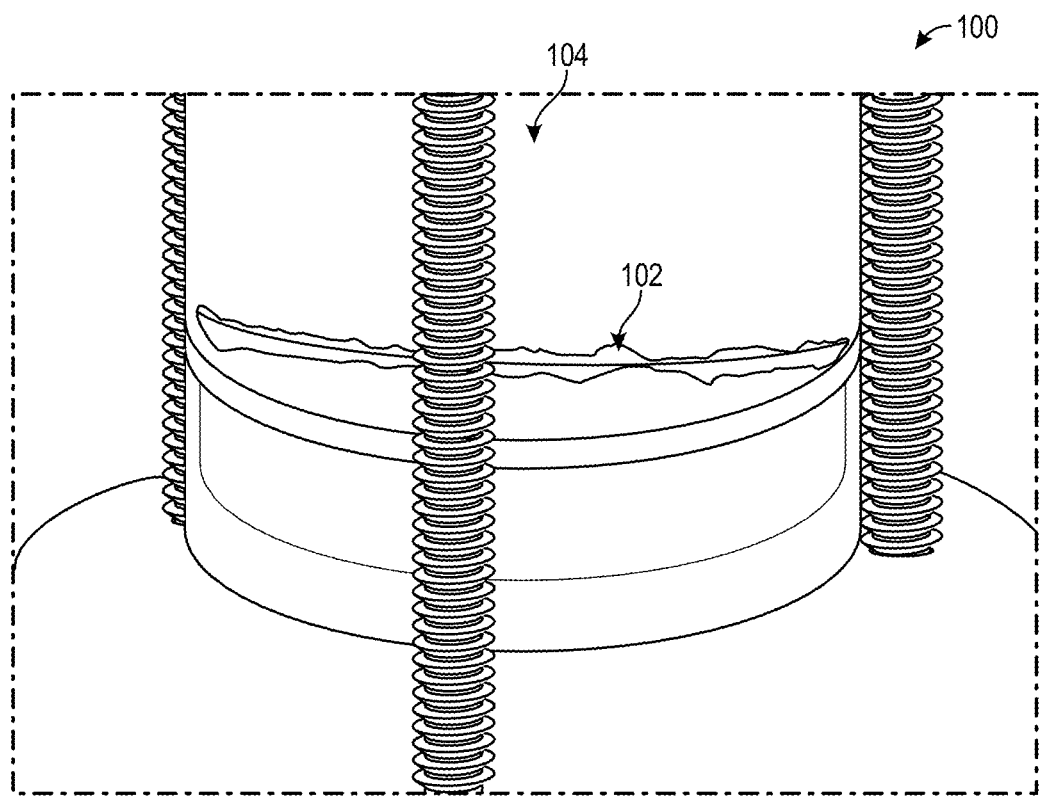
FIG. 1 is a perspective view of a portion of a chromatography column.
Figure 2:
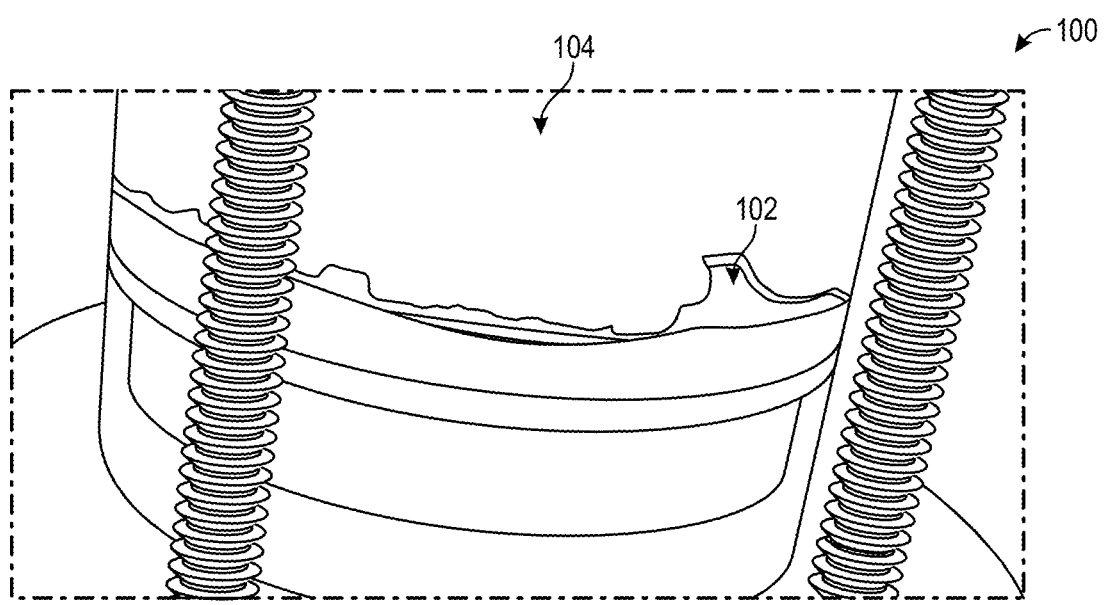
FIG. 2 is a perspective view of another portion of a chromatography column.

FIGS. 1 and 2 are views of portions of chromatography columns 100 and 200. Cavities 101 and 201 have formed in the packed beds 101 and 102, respectively, and there are liquid-filled spaces between the packed beds and the end plate assemblies of the columns. In these figures the column was operated with flow entering at the bottom of the column and exiting at the top. The continued settling of the resin after packing thus permitted the entire bed to be pushed upwards during flow, creating voids at the bottom of the column bed. Had flow been in a downwards direction, the voids would have formed at the top of the column bed.

The presence of cavities 101 and 201, and the end spaces in columns 100 and 200 can result in the non-uniform movement of mobile phase through the columns 100 and 200. Portions of the mobile phase passing through the cavities and end spaces travel the vertical distance faster than portions of the mobile phase passing through the chromatography bed via a longer path. Those skilled in the art recognize that this differential flow of the mobile phase can create multiple and/or non-ideal peaks, leading to decreased column performance.

Embodiments of the present disclosure relate to dynamic axial compression columns that can eliminate and/or minimize the formation of cavities and end spaces within the bed of the column irrespective of the direction of flow Specifically, the dynamic axial compression columns comprise a tube defining a lumen. This tube has a first (top) end assembly and a second (bottom) end assembly, which when inserted into the tube bound the lumen and define a lumen space within the tube extending between a first opening in the first (top) end and a second opening in the second (bottom) end. The first (top) end assembly can be movable with respect to the second (bottom) end assembly, and with respect to the tube such that a distance between the first (top) end assembly and the second (bottom) end assembly can change. In some embodiments, pressure on the first (top) end plate can cause movement of the first (top) end assembly towards the second (bottom) end assembly that decreases the distance between the first (top) end assembly and the second (bottom) end assembly. This decrease in distance can decrease a volume of the lumen space.

In this document, "first" and "top", when referencing an end assembly or part thereof, are used interchangeably. The words "second" and "bottom" are similarly used interchangeably. The terms are descriptive only and do not necessarily refer to the relative heights above the ground of the end assembly or part thereof during use. That is, if the column is inverted, what is described in this document as "top" would to an observer be seen as the "bottom" and vice versa.

In some embodiments, the first end assembly can be biased towards the second end assembly by a compression device. Due to this biasing, the first and the second end assemblies can move closer together in the event of any settling of the media in the column, thereby preventing the formation of a cavity. This compression device is external to the lumen.

Figure 3:
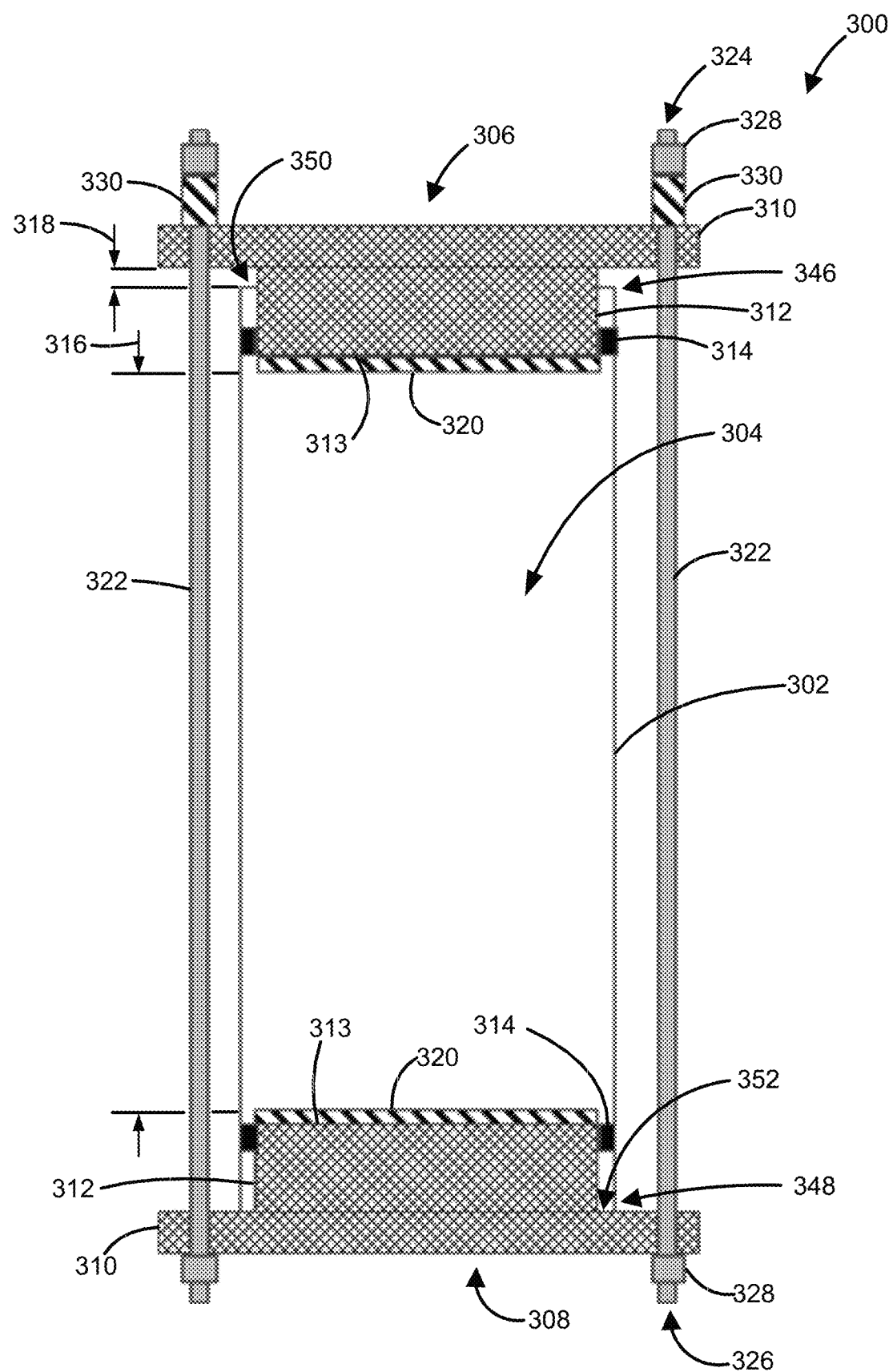
FIG. 3 is one embodiment of a dynamic axial compression column.

With reference to FIG. 3, one embodiment of the column 300 is shown, which column 300 can be a chromatography column 300, also referred to herein as a dynamic axial compression column 300. The column 300 includes tube 302, having a first end 346 and a second end 348, and defining a lumen 304. The tube 302 can comprise a variety of shapes and sizes and can be made from a variety of materials. In some embodiments, the tube 302 can be circular. The tube 302 can be made from any desired materials, including one or several metals, alloys, polymers, composites, glass, or the like. In some embodiments, a material can be selected to handle a desired range of pressures and mobile phases through the tube 302.

As seen in FIG. 3, the column 300 can comprise a first end assembly 306, also referred to herein as a first end plate assembly 306, a top end assembly 306, or a top end plate assembly 306, and a second end assembly 308, also referred to herein a second end plate assembly 308, a bottom end assembly 308, or a bottom end plate assembly 308. In some embodiments, each end assembly 306, 308 can be comprised of an end plate 310 which is external to tube 302; an insert 312; and optionally a frit 320 which can be in contact with the lower surface of insert 312. The end assembly 306, 308 also contains a sealing mechanism 314 such as an O-ring, gasket, inflatable bladder and the like, which prevents material from within the lumen from escaping the tube during operation of the column.

In some embodiments, the end plate 310 and insert 312 are a single piece. In some embodiments, the end plate 310 and insert 312 are two distinct pieces joined together Each of the first and second end assemblies can comprise a variety of shapes and sizes and can be made from a variety of materials. In some embodiments, one or more of the component parts of the end assemblies can be made from one or several metals, alloys, polymers, composites, combinations of the foregoing or the like. In some embodiments, a material can be selected to handle a desired range of pressures and mobile phases through the tube 302.

With reference to FIG. 3, in the case of the lower end assembly, in one embodiment the end plate can be in direct contact with the lower end of tube 302. In the case of the upper assembly, in one embodiment a gap 318 can optionally exist between the bottom surface of the end plate 310 and the top surface of tube 302.

In some embodiments, the top end assembly can move with respect to the tube 302 while the sealing mechanism 314 can continue to seal the top opening 350, also referred to herein as a first opening 350, of the tube 302. The top opening 350 can be located in the first end 346 of the tube 302. In some embodiments, for example, the top end assembly can move with respect to the tube 302 such that distance 318 decreases and distance 316 increases. Specifically, in some embodiments, as the media within the lumen settles or further compresses, movement of the top end assembly 306 towards the bottom end assembly 308 will cause the volume of the lumen space to decrease and eliminate any cavities or end spaces which may form.

In some embodiments, the bottom end assembly 308, via similar features to the top end assembly 306, can be movable with respect to the top end assembly 306 and/or with respect to the tube 302. In some embodiments, the bottom end assembly 308 can be fixed with respect to the tube 302. The bottom end assembly 308 can, in some embodiments, seal a bottom opening 352, also referred to herein as a second opening 352, of the tube 302. The bottom opening 352 can be located in the second end 348 of the tube 302.

Each of the first and second heads 306, 308 can include an inward face 313. Thus, the first head 306 can have a first inward face 313 and the second head 308 can have a second inward face 313. In some embodiments, the inward face 313 of the heads 306, 308 is the portion of the insert that extends furthest into the lumen 304 of the elongate member 302. In some embodiments, and as shown in FIG. 3, each of the inward faces 306, 308 is covered by a frit 320. The frit 320 can comprise a porous member that allows the passing of mobile phase while preventing the passing of the stationary phase. The frit 320 can comprise, for example, a mesh, a screen, fritted glass, fritted plastic, sintered ceramic or metal, or the like.

The top and bottom end assemblies 306, 308 can be coupled and/or connected via a plurality of rods 322. The rods 322 can comprise a variety of shapes and sizes and can be made from a variety of materials. In some embodiments, each of the rods 322, as depicted in FIG. 3, can extend along the outside of the tube 302 and can connect the top end assembly 306 and the bottom end assembly 308, and specifically can connect the end plate 310 of the top end assembly 306 to the end plate 310 of the bottom end assembly 308. In some embodiments, each of the rods 322 extends through a hole in the end plate 310 of the first head assembly 306 to allow the top end plate assembly 306 to move with respect to the rods 322. In some embodiments, each of the rods 322 extends through a hole in the end plate 310 bottom end assembly 308 to allow the bottom end plate 310 to move with respect to the rods 322.

In some embodiments, the plurality of rods 322 can comprise any desired number of rods 322. In some embodiments, the plurality of rods 322 can comprise, for example, at least two rods 322, at least three rods 322, at least four rods 322, or the like. In some embodiments, the number of rods can increase as the width or diameter of the tube 302 increases.

Each of the rods 322 can include a first end 324 and a second end 326. In some embodiments each of the first and second ends 324, 326 can comprise a stop feature 328. The stop feature 328 can be configured to engage with one of the end plate assemblies 306, 308, and specifically with one of the end plates 310 of the end plate assemblies 306, 308 to prevent movement of the end plate assembly 306, 308, and specifically the end plate 310 beyond that stop feature 328. In some embodiments, the stop features 328 can comprise a nut, a flange, a snap ring, a cotter pin, or the like. In some embodiments in which, for example, the bottom end assembly 308 is not movable with respect to the rod 322, the stop feature 328 can comprise physical connection between the rod 322 and the bottom end assembly 308, and specifically the end plate 310 of the bottom end assembly such as, for example, a weld. In some embodiments, the stop feature 328 can comprise a nut, and each of the first and second ends 324, 326 of the rods 322 can be threaded so as to screw into and thereby engage the nut.

In some embodiments, and as depicted in FIG. 3, the chromatography column 300 can comprise a plurality of compression devices 330. Each of these compression devices can be external to the tube 302, and each of these compression devices 330 can engage with one of the rods 322 and one of the end plate assemblies 306, 308 to thereby move the end assemblies 306, 308 towards each other. In the embodiment depicted in FIG. 3, each of the rods 322 has a compression device 330 which engages with the rod 322, and specifically engages with the rod 322 via the rod's 322 stop feature 328 and with the top end plate assembly 306 and specifically with the base 310 of the top end plate assembly 306. The compression devices 330 can generate and apply a first force to other components of the chromatography column 300 to bias the first end plate assembly 306 towards the second end plate assembly 308.

Figure 4:
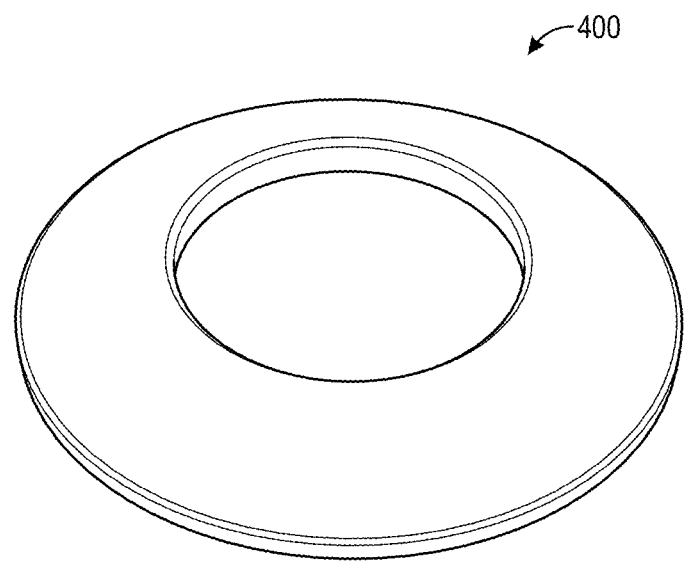
FIG. 4 is a perspective view of one embodiment of a disc of a disc spring.
Figure 5:
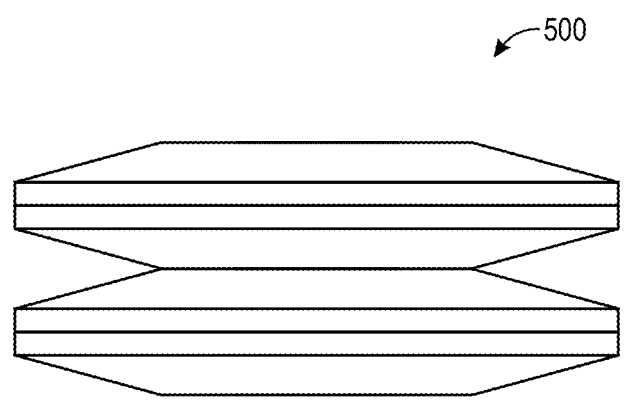
FIG. 5 is a side view of one embodiment of a stack of discs forming a disc spring.

Each of the compression devices 330 can comprise a member configured to generate a biasing force. In some embodiments, each of the compression devices 330 can comprise a spring such as, for example, a coil spring, a disc spring, a wave-spring, or the like. In some embodiments in which the spring comprises a disc spring, the disc spring can comprise a plurality of discs 400 as shown in FIG. 4, which discs 400 can be arranged to form a stack 500 as shown in FIG. 5. In some embodiments, one or several of the compression devices 330 can comprise a pneumatic cylinder, a hydraulic cylinder, a polymer compression device, a metallic spring, a polymer spring, or the like. Thus, in some embodiments, each of the compression devices 330 can comprise a plurality of stacked discs 400. In some embodiments, the stack 500 can comprise a parallel stack in which all of the discs 400 in the stack 500 have the same orientation, or a series stack or a parallel-series stack in which some of the discs 400, or in other words in which at least two of the discs 400 in the stack 500 have opposite orientations.

Figure 6:
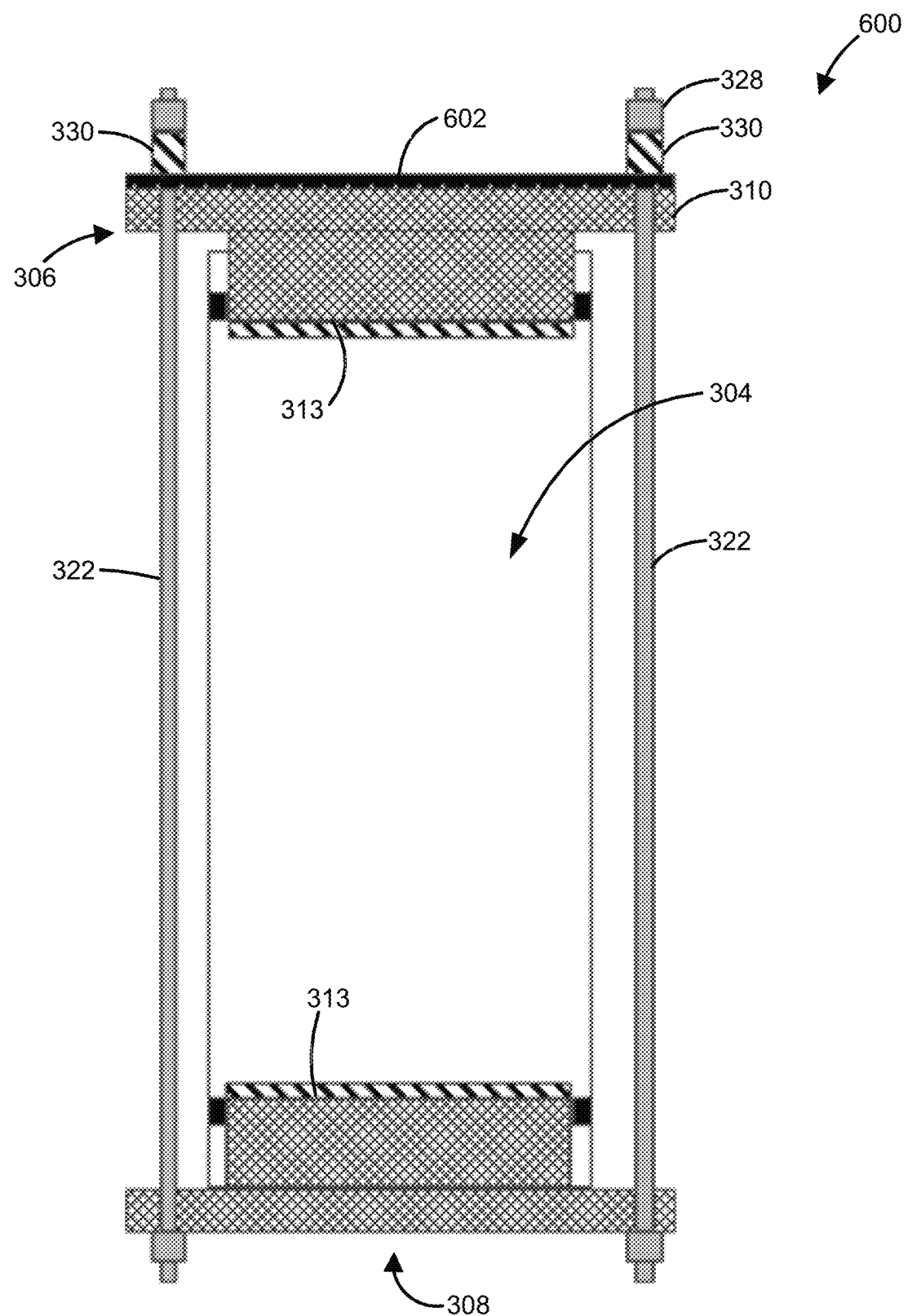
FIG. 6 is a view of an embodiment of a chromatography column including an equalizing plate.

In some embodiments in which the first end plate assembly 306 moves with respect to the tube 302, the compression devices 330 can comprise a first set of compression devices 330. As shown in embodiment shown in FIG. 7, a view of another embodiment of the chromatography column 700, also referred to herein as column 700 or as dynamic axial compression column, each of the first end plate assembly 306 and the second end plate assembly 308 move with respect to the tube 302, and the compression devices 330 can comprise a first set of compression devices 330-A, also referred to herein as a first plurality of compression devices 330-A, and a second set of compression devices 330-B, also referred to herein as a second plurality of compression devices 330-B. In some embodiments, the first set of compression devices 330-A can engage with the rods 322 and the first end plate assembly 306 and the second set of compression devices 330-B can engage with the rods 322 and the second end plate assembly 308. In some embodiments, each of the first and second sets of compression devices 330-A, 330-B can be external to the lumen 304 and the tube 302, each of the first set of compression devices 330-A can engage one of the rods 322 and bias the first end plate assembly 306 towards the second end plate assembly 308, and each of the second set of compression devices 330-B can engage one of the rods 322 and bias the second end plate assembly 308 towards the first end plate assembly 306. In some embodiments, this can include the first set of compression devices 330-A applying a first force and/or pressure to bias the first end plate assembly 306 towards the second end plate assembly 308. In some embodiments, and as shown in FIG. 6, the fluid flowing within the chromatography column 700 can exert a pressure against all surfaces of the column 700. This pressure, referred to as a backpressure, is indicated by arrows 380 in FIG. 6. If the backpressure exceed the pressure generated by the compression devices 330, then a headspace can be created in the chromatography column 700.

In some embodiments, the first pressure applied by the first set of compression devices 330-A is equal to or greater than the backpressure in the chromatography column 700 to eliminate headspace creation. In some embodiments, the first pressure is less than a maximum pressure for applying to the media without destroying, damaging, or fracturing the media.

In some embodiments, the plurality of compression devices 330 are together configured to apply a force and/or a pressure to bias the first end plate assembly 306 towards the second end plate assembly 308. In some embodiments, the plurality of compression devices 330 are together configured to apply a force and/or a pressure to the media contained within the lumen 304.

In some embodiments in which the stop feature 328 comprises a nut, the stop feature 328 can be adjusted to change a compression of the compression devices 330. In some embodiments, this changing of the compression of the compression devices 330 can change the force applied by the compression devices 330 to bias the first end plate assembly 306 towards the second end plate assembly 308. In some embodiments, adjusting the stop feature 328 can include, for example, tightening or loosening the nut comprising the stop feature 328. In some embodiments, for example, the nut comprising the stop feature 328 can be tightened or loosened until a desired torque of the nut is reached.

Figure 7:
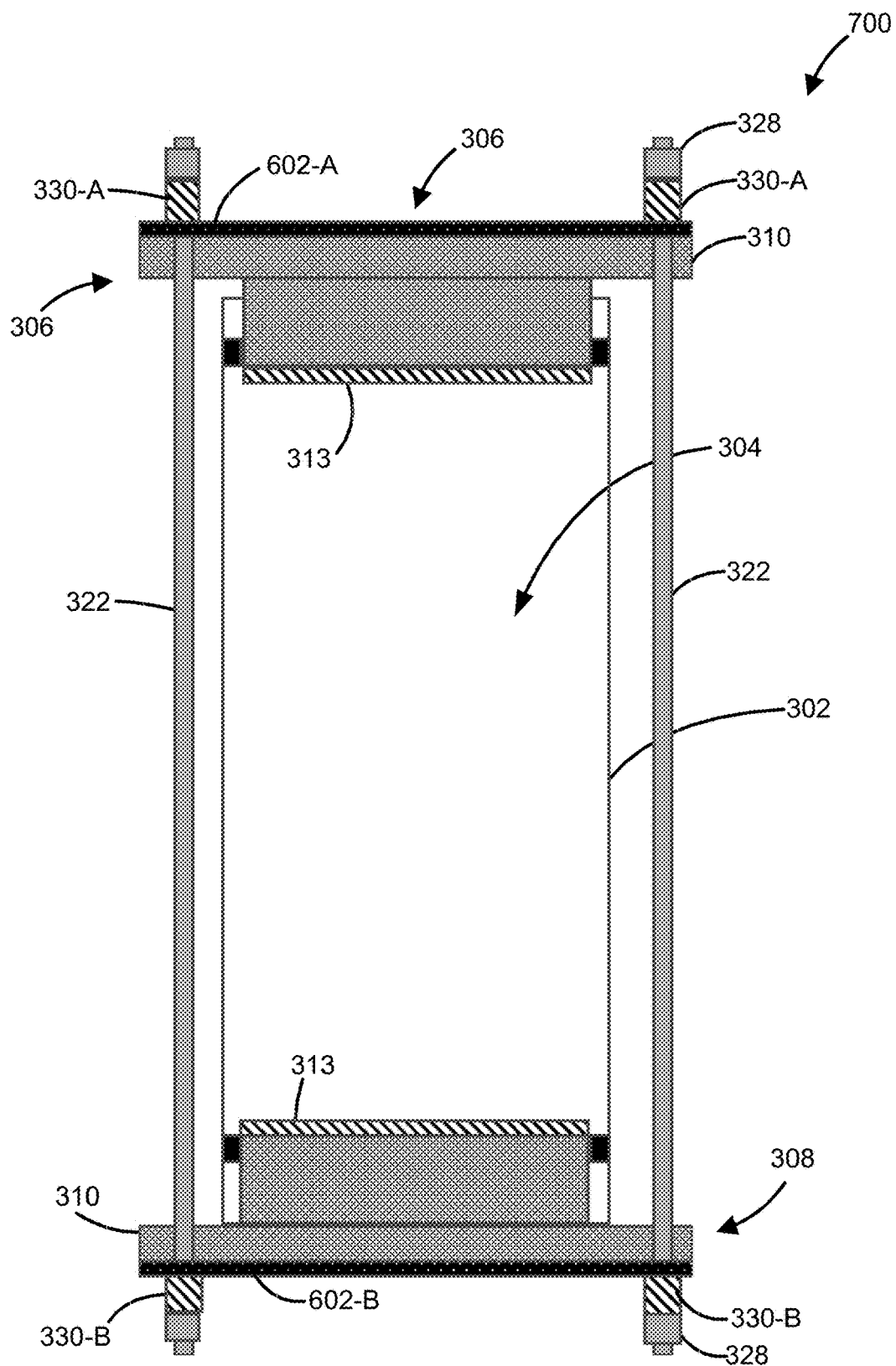
FIG. 7 is a view of another embodiment of the chromatography column.

With reference now to FIG. 6, a view of another embodiment of the chromatography column 600, also referred to herein as column 600 or as dynamic axial compression column is shown. The column 600 can include the components and features of column 300 shown in FIG. 3. However, the column 600 shown in FIG. 6 can include one or more equalizing plates 602. The equalizing plate 602 can comprise an intermediate member located between the compression devices 330 and one of the end plate assemblies 306, 308. In some embodiments in which each of the end plate assemblies 306, 308 is moveable with to the tube 302, and as shown in FIG. 7, a first equalizing plate 602-A can be located between first compression devices 330-A and the first end plate assembly 306, and a second equalizing plate 602-B can be located between second compression devices 330-B and the second end plate assembly 308.

In the embodiment of FIG. 6, the equalizing plate 602 is located between the compression devices 330 and the first end plate assembly 306. The equalizing plate 602 can comprise a variety of shapes and sizes and can be made from a variety of materials.

The equalizing plate 602 can be configured to receive force from the compression devices 330 and apply this force equally across the surface of the end plate(s) 310 contacted by the equalizing plate 602, and thus equally across the end plate assembly 306, 308 contacted by the equalizing plate 602. Thus, in the embodiment shown in FIG. 6, the equalizing plate 602 equally transfers force from the compression devices 330 to the first end plate assembly 306.

In some embodiments, this equal application of force to the end plate 310 results in the end plate assembly 306, 308 applying equal force to the media in the lumen 304. Further, in the event that the end plate assembly 306, 308 moves with respect to the tube 302, the equal application of force to the end plate 310 results in the end plate assembly 306, 308, and specifically the insert 312, equally moving with respect to the tube 302 such that the inward faces of the first and second inserts 312 and frits 320 (those faces in contact with the lumen) are and remain parallel.

Figure 8:
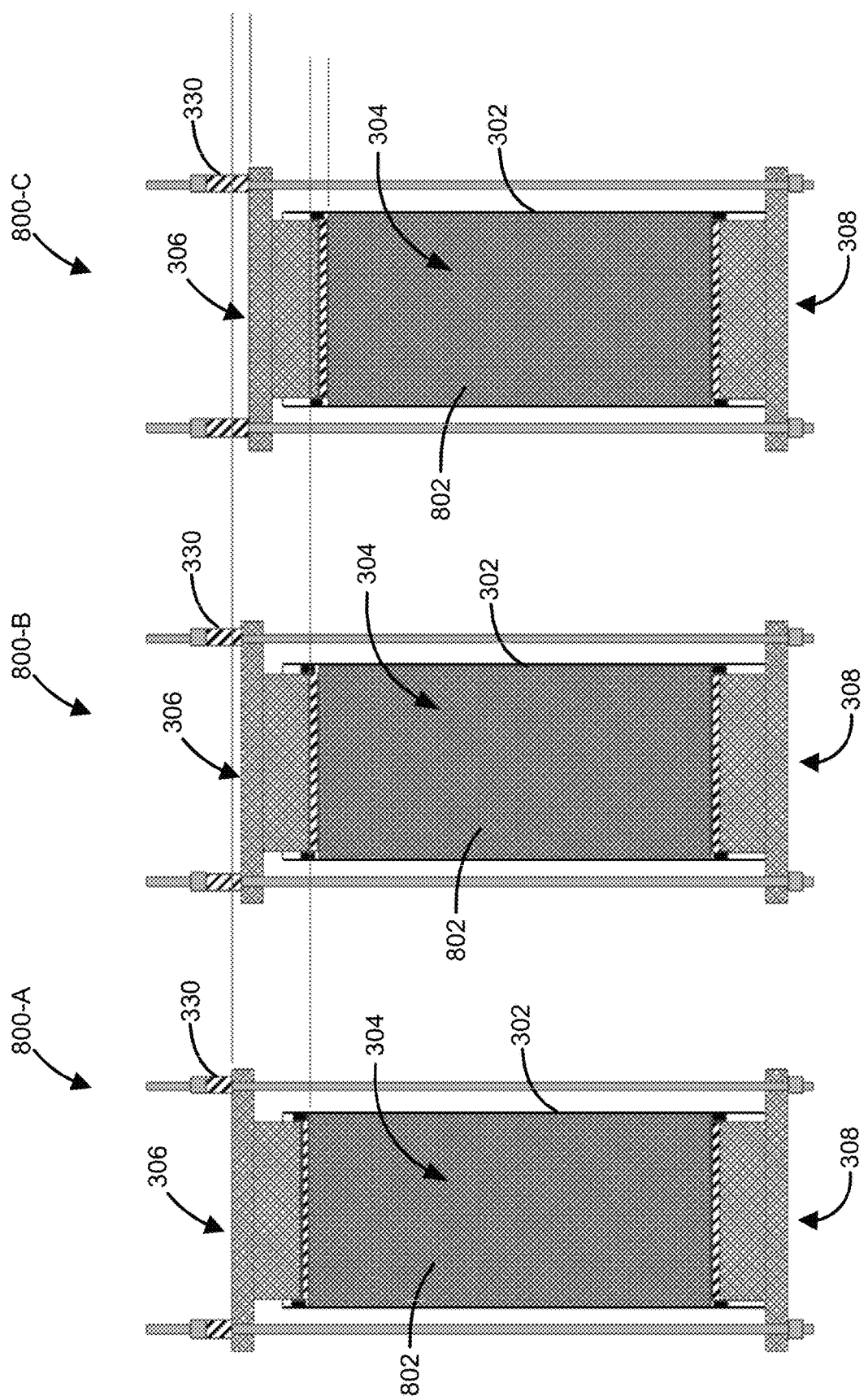
FIG. 8 is a schematic depiction of the movement of the first end plate of a chromatography column with respect to the second end plate of the chromatography column.

With reference now to FIG. 8, a schematic depiction of the movement of the first end plate assembly 306 with respect to the second end plate assembly 308 and the tube 302 in a series of chromatography columns 800, also referred to herein as columns 800 or as dynamic axial compression columns 800 is shown. FIG. 8 depicts a single column 800 having a first end plate assembly 306 in three different positions. The column 800 includes the tube 302 defining a lumen 304. The lumen 304 is filled with media 802. The media can be compressible or incompressible. In some embodiments, the media 802 can be an incompressible media comprising at least one of: silica; alumina; zirconia; glass; hydroxyapatite; and flourapatite. In some embodiments, the media 802 can comprise a solid product in the form of fine particles that are packed into the lumen 304 for a chromatographic bed.

The column 800 includes the first and second end plate assemblies 306, 308 as described above. The first end plate assembly 306 is biased towards the second end plate assembly 308 by compression devices 330. The compression devices 330 apply a pressure to the media 802 filling the lumen 304 by applying a force to first end plate assembly 306. This pressure applied to the media can be less than a maximum pressure for applying to the media 802 without destroying, damaging, or fracturing the media 802.

As seen in FIG. 8, the first end plate assembly 306 of column 800-A is in a first position, the first end plate assembly 306 of column 800-B is in a second position, and the first end plate assembly 306 of column 800-C is in a third position. In some embodiments, each of the columns 800 can include the same amount of media 802, but the media in columns 800-B, 800-C has settled and/or compressed more than the media 802 in column 800-A. As the media 802 settles, the compression devices 330 apply a force to the first end plate assembly 306 such that the first end plate assembly 306 advances from the first position to the second position, and then upon further compression and/or settling, to the third position. Due to this advance of the first end plate assembly 306 into the lumen, cavities and/or end plate space are prevented from forming. Thus, this movement of the first end plate assembly 306 can correspond to the compaction of the chromatographic bed.

This description should not be interpreted as implying any particular order or arrangement among or between various steps or elements except when the order of individual steps or arrangement of elements is explicitly described. Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A dynamic axial compression column comprising:
   a tube defining:
      a first opening,
      a second opening, and
      a lumen extending from the first opening through the tube to the second opening;
   a first end plate assembly sealing the first opening and movably extending at least partially into the lumen via the first opening;
   a second end plate assembly sealing the second opening;
   a plurality of rods each extending along an outside of the tube and connecting the first end plate assembly and the second end plate assembly; and a first plurality of compression devices external to the tube, each of the first plurality of compression devices engaging one of the plurality of rods and biasing the first end plate assembly towards the second end plate assembly, wherein each of the first plurality of compression devices comprises a spring.

2. The dynamic axial compression column of claim 1, further comprising media filling the lumen.

3. The dynamic axial compression column of claim 2, wherein the media is compressible.

4. The dynamic axial compression column of claim 2, wherein the media is incompressible.

5. The dynamic axial compression column of claim 4, wherein the media comprises at least one of:
   silica;
   alumina;
   zirconia;
   glass;
   hydroxyapatite; and
   flourapatite.

6. The dynamic axial compression column of claim 4, wherein the first plurality of compression devices are configured to apply a first pressure to the media filling the lumen.

7. The dynamic axial compression column of claim 6, wherein the first pressure is less than a maximum pressure for applying to the media without damaging the media.

8. The dynamic axial compression column of claim 1, wherein the plurality of rods comprise at least two rods.

9. The dynamic axial compression column of claim 1, wherein the spring comprises a disc spring.

10. The dynamic axial compression column of claim 9, wherein the disc spring comprises a plurality of stacked discs.

11. The dynamic axial compression column of claim 10, wherein at least two of the plurality of stacked discs have opposite orientations.

12. The dynamic axial compression column of claim 1, wherein the second end plate assembly movably extends at least partially into the lumen via the second opening.

13. The dynamic axial compression column of claim 1, wherein the first plurality of compression devices are configured to apply a first pressure to bias the first end plate assembly towards the second end plate assembly.

14. The dynamic axial compression column of claim 13, wherein the first pressure is equal to or greater than a backpressure in the column and thereby eliminates headspace creation.

15. The dynamic axial compression column of claim 1, wherein the tube is circular.

16. The dynamic axial compression column of claim 15, wherein the tube has a diameter of at least three centimeters.

17. The dynamic axial compression column of claim 1, wherein the first end plate assembly comprises a first inward face, and wherein the second end plate assembly comprises a second inward face, and wherein each of the first inward face and the second inward face are covered by a frit.

18. A dynamic axial compression column comprising:
a tube defining:
   a first opening,
   a second opening, and
   a lumen extending from the first opening through the tube to the second opening;
a first end plate assembly sealing the first opening and movably extending at least partially into the lumen via the first opening;
a second end plate assembly sealing the second opening;
a plurality of rods each extending along an outside of the tube and connecting the first end plate assembly and the second end plate assembly;
a first plurality of compression devices external to the tube, each of the first plurality of compression devices engaging one of the plurality of rods and biasing the first end plate assembly towards the second end plate assembly; and
an equalizing plate positioned between the first plurality of compression devices and the first end plate assembly, the equalizing plate configured to equally transfer force from the first plurality of compression devices to the first end plate assembly.

19. A dynamic axial compression column comprising:
a tube defining:
   a first opening,
   a second opening, and
   a lumen extending from the first opening through the tube to the second opening;
a first end plate assembly sealing the first opening and movably extending at least partially into the lumen via the first opening;
a second end plate assembly sealing the second opening;
a plurality of rods each extending along an outside of the tube and connecting the first end plate assembly and the second end plate assembly;
a first plurality of compression devices external to the tube, each of the first plurality of compression devices engaging one of the plurality of rods and biasing the first end plate assembly towards the second end plate assembly; and
a second plurality of compression devices.

20. The dynamic axial compression column of claim 19, wherein each of the second plurality of compression devices are external to the tube, and wherein each of the second plurality of compression devices engage one of the plurality of rods and bias the second end plate assembly towards the first end plate assembly.

21. The dynamic axial compression column of claim 20, further comprising a second equalizing plate positioned between the second plurality of compression devices and the second end plate assembly, the second equalizing plate configured to equally transfer force from the second plurality of compression devices to the second end plate assembly.

* * * * *